April 10, 1934.　　　H. H. HARSTED　　　1,954,127
FISHING FLY BOOK
Filed June 6, 1932

Inventor
Harry H. Harsted
By [signature]
Atty.

Patented Apr. 10, 1934

1,954,127

UNITED STATES PATENT OFFICE 1,954,127

FISHING FLY BOOK

Harry H. Harsted, Chicago, Ill.

Application June 6, 1932, Serial No. 615,536

7 Claims. (Cl. 43—32)

This invention relates to improvements in books for carrying artificial fishing flies, and one of the objects of the same is to provide an improved book of this character for preserving in good condition and for carrying artificial flies, and which book may be readily carried upon the person of the user, the book being so arranged that ready access may be had to the interior thereof, so that the leaves of the book may be readily manipulated to facilitate the selection and removal of the particular bait or fly desired.

A further object is to provide improved means for securing the book to the person of the user and improved means for preventing the book from swinging out or away from the body of the user when stooping or bending over.

A further object is to provide in a device of this character improved means for holding moist pads and for preventing displacement thereof, and by means of which pads the leader or snoods may be moistened.

Figure 1:
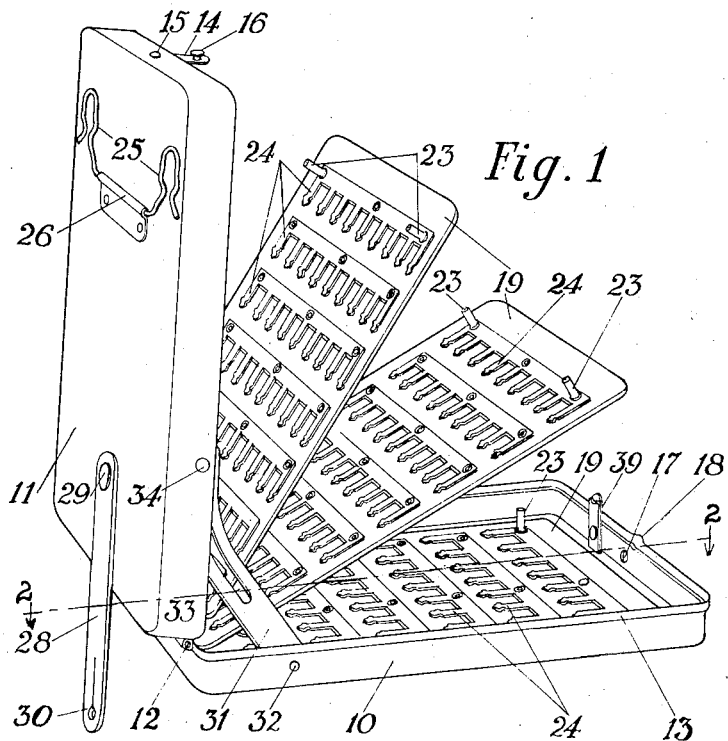
Figure 1 is a perspective view of a book of this character constructed in accordance with the principles of this invention.

Referring more particularly to the drawing, the book consists essentially of two members 10 and 11 hingedly connected together as at 12 and these members may be formed of any desired material and of any size and configuration, but preferably are of an oblong contour. The members 10 and 11 are preferably in the form of trays of uniform depth, and the upper edge of the walls of one of the trays is deflected outwardly as at 13 so as to receive the lower edge of the other member 11. The trays are secured together against separation in any desired or suitable manner preferably by means of a catch having a spring body portion 14 secured to one of the walls of the section 11 as at 15 to project beyond the edge of the wall and carried by the projecting portion of the spring 14 is a formation 16 adapted to enter an opening 17 in the wall of the section 10. The formation or projection 16 extends for a slight distance beyond the outer surface of the wall of the section 10 so as to permit the operator to depress the same to disconnect the fastening device from the section 10. If desired, a portion of the flange 13 may be deflected as at 18 to form a protection for the projection 16.

Arranged within the book thus formed and between the sections 10 and 11 are a plurality of leaves or partitions 19 which are of a size and configuration to substantially fill the interiors of the sections, and any number of these leaves 19 may be provided.

In the present form of the invention three of the leaves are shown, and these leaves are connected by one end to the pivot pin of the sections 10 and 11, preferably by means of hinged members 20, 21 and 22. These hinged members are so shaped that they will permit the leaves 19 to be moved about their respective pivots and when the leaves are in a closed position with respect to each other, the hinged members serve as supports for maintaining the proximate edges of adjacent leaves spaced from each other.

Carried by the other ends of the leaves are projections 23 in the form of pins or legs which serve as a means for holding the free edges of the leaves spaced from each other when the leaves are brought into proximity.

Mounted upon each of the leaves 19 is a series of spring catches 24 of any desired configuration, and beneath which catches the flies or baits are temporarily held and by means of which they are secured to the leaves.

It will be readily manifest that when the sections 10 and 11 are open with respect to each other the leaves 19 and 20 may be readily manipulated so that access may be had to the desired fly or bait.

The device is adapted to be secured to the person of the user so as to be maintained in a convenient position and with the section 11 against the body, so that when the parts are in the position shown in Figure 1, the section 10 may be lowered so as to permit access to the leaves.

The section 11 is secured to the person preferably by means of a fastening device, preferably shaped to provide spring clips 25 which are hingedly connected as at 26 to the outer face of the section 11. These clips 25 are adapted to engage over buttons 27 secured to the garment of the wearer, which buttons are properly arranged so as to receive the spring clips 25. Any form of button may be employed, but preferably a button which may be readily removed and secured to the garment at any desired position and in proper position with respect to the spring clips 25.

The hinge 26 permits the book to swing with respect to the body and in order to prevent the lower end of the book or section 11 from swinging away from the body when the user stoops or bends over, a fastening member 28, preferably in the form of a flexible strap is secured by one end as at 29 to the section 11 and by its other end 30 to the garment of the user.

Supports 31 are provided for supporting the section 10 in its lowered position. These supports consist of members pivotally connected as at 32 to one of the book sections and are provided with slots 33 in which pins or guides 34 connected to the other book section are adapted to slide and the slots 33 are of a shape to permit free movement of the sections with respect to each other. When the section 10 is in its lowermost position the ends of the slots 33 will engage and rest upon the pins or guides 34.

Figure 2:
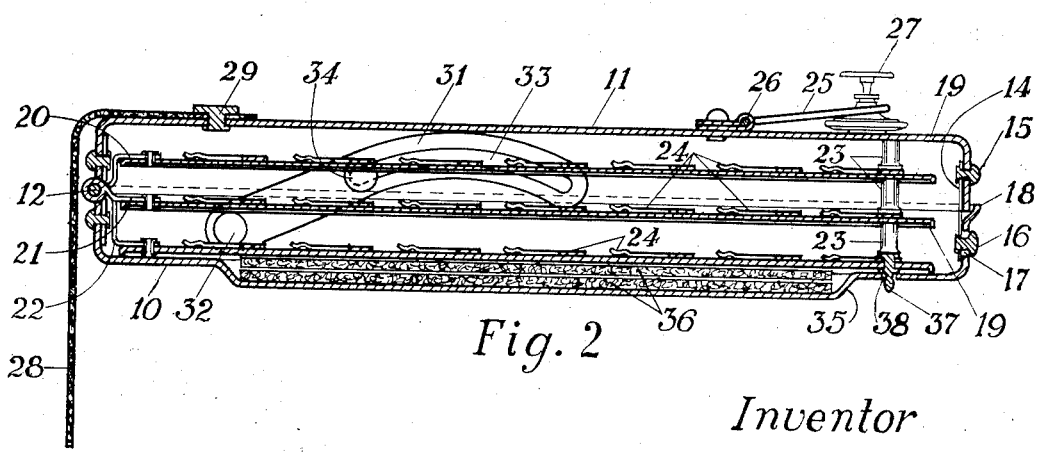
Figure 2 is a longitudinal sectional view of the book closed and on an enlarged scale, and taken on the line 2—2 indicated in Figure 1.

It will thus be manifest that in securing the book to the person the hinged ends are arranged lowermost so that the fastening catch 14 will be uppermost and in a convenient position to be readily engaged so as to release the section 10 and allow it to be moved downwardly to the position shown in Figure 1, or until the ends of the slot 33 rest upon the guides 34. This will permit the leaves 19 to be readily manipulated to remove the desired fly or bait. When this has been accomplished the device may be closed by raising the section 10 as the leaves 19 will fall by gravity to the position shown in Figure 2.

The section 10 is preferably provided with a depressed portion 35 to form a receptacle in which pads 36 may be arranged. These pads are maintained moist, and the receptacle 35 is preferably of a depth that the exposed surface of the uppermost pad will be substantially flush with the face of the remaining portion of the bottom of the section 10. One of the leaves 19 will form a closure for the receptacle 35, the hinge 22 being shaped to permit the leaf to rest against the face of the section 10.

A fastening device 37 may be secured to the leaf 19 to pass through an opening 38 in the bottom of the section 10 to releasably secure the adjacent leaf 19 in position and thereby prevent displacement of the pads 36. These pads 36 are provided for the purpose of moistening the leaders or snoods of the bait.

If desired a line securing or fastening clip 39 may be secured to one of the walls of the receptacle 10 to project thereabove and by means of which the line may be anchored while the user is manipulating the supports within the book or removing a fly from beneath one of the hooks. This anchoring clip 39 is so positioned that when the section 11 is closed with respect to the section 10, the clip will be disposed within the closed receptacle.

What is claimed as new is:—

1. In a device of the character described a pair of shallow receptacles hingedly connected together at one edge, means for detachably securing one of the receptacles to the person of the user for causing the same to constantly maintain an upright position when the other receptacle is swung to an open position, a foldable support connected to the receptacles, a plurality of article supporting leaves, an eye on one end of each of said leaves registering with the eyes of the hinge of the receptacles for receiving the receptacle hinge pin whereby the leaves will be hinged by one edge to lie within the receptacles, means for maintaining the leaves laterally spaced from each other, and fastening means for maintaining the receptacles against opening movement with respect to each other.

2. In a device of the character described, a pair of shallow receptacles hingedly connected together at one edge whereby one receptacle will form a closure for the other, means for detachably securing one of the receptacles to the person of the user for movement with respect thereto and for maintaining the same in an upright position, a flexible anchoring means secured to one of the receptacles and the person of the user for maintaining the last said receptacle against swinging away from the body of the user, arms pivotally connected to one of the receptacles and slidably connected to the other receptacle for limiting the opening movement of the receptacles, leaves pivotally secured by one edge to lie between the receptacles, the hinge between the receptacle and for the leaves being formed by a single pin common thereto, article securing means carried by the leaves, means for maintaining the leaves laterally spaced from each other, and fastening means for relasably securing the receptacles together with the leaves therebetween and against separation with respect to each other.

3. In a device of the character described two shallow receptacles pivotally connected together at one end and each forming a closure for the other, the edge of the wall of one member being deflected to receive the edge of the wall of the other member, said deflected portion forming a stop to limit the closing movement of the said receptacles, means for securing one of the receptacles to the body of the user and for maintaining the same constantly upright, a plurality of leaves between the receptacles, hinges individual to the leaves and arranged at the same end of the leaves for pivotally anchoring them, said hinges being shaped to maintain said ends of the leaves laterally spaced from each other to provide a considerable space between said ends, spacing means carried by the leaves for maintaining the other ends of the leaves spaced, and supports for one of the receptacles pivotally connected with one of the receptacles and slidably connected with the other receptacle.

4. In a device of the character described, two shallow receptacles pivotally connected together at one end and each forming a closure for the other, means for securing one of the receptacles to the body of the user and for maintaining the same constantly upright, a plurality of leaves between the receptacles, hinges individual to the leaves and arranged at the same end of the leaves for pivotally anchoring them, said hinges being shaped to maintain said ends of the leaves laterally spaced from each other to provide a considerable space between said ends, said receptacles and leaves being mounted to swing about a common axis, spacing means carried by the leaves for maintaining the other ends of the leaves spaced, supports for one of the receptacles pivotally connected with one of the receptacles and slidably connected with the other receptacle, and an additional anchoring means between the body of the user and the receptacle to maintain the receptacle against swinging away from the body of the user when the user bends over.

5. In a device of the character described, two shallow receptacles hinged together at one edge, each forming a closure for the other, means for supporting the same upon the person of the user, means releasably securing the receptacles against separation, a portion of the bottom of one of the receptacles being shaped to form an open pad receiving chamber within the confines of the wall thereof, leaves hingedly mounted within the receptacles, means for maintaining the leaves laterally spaced from each other, one of the leaves forming a closure for the said chamber, and means for releasably securing the last said leaf against movement with respect to the receptacle in which said chamber is arranged.

6. In a device of the character described, a pair of shallow receptacles hingedly connected together at one edge, means for detachably securing one of the receptacles to the person of the user for causing the same to constantly maintain an upright position when the other is swung to an open position, a plurality of article holding leaves hinged within the receptacle, and a line anchoring clip secured to one of the walls of one of the receptacles.

7. In a device of the character described, a pair of shallow receptacles hingedly connected together at one edge, means for detachably securing one of the receptacles to the person of the user for causing the same to constantly maintain an upright position when the other is swung to an open position, a plurality of article holding leaves hinged within the receptacle, and a line anchoring clip secured to one of the walls of one of the receptacles, said anchoring clip being housed within and protected by the receptacles when they are in closed position with relation to each other.

HARRY H. HARSTED.